(12) United States Patent
Kobayashi

(10) Patent No.: US 11,941,003 B2
(45) Date of Patent: Mar. 26, 2024

(54) SEARCH METHOD AND SEARCH APPARATUS FOR SEARCHING GRAPH DATA BASED ON SEARCH QUERY

(71) Applicant: FUJITSU LIMITED, Kawasaki (JP)

(72) Inventor: Kenji Kobayashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 160 days.

(21) Appl. No.: 17/170,476

(22) Filed: Feb. 8, 2021

(65) Prior Publication Data

US 2021/0263933 A1 Aug. 26, 2021

(30) Foreign Application Priority Data

Feb. 26, 2020 (JP) ................................ 2020-030479

(51) Int. Cl.
*G06F 16/2453* (2019.01)
*G06F 16/2455* (2019.01)
*G06F 16/901* (2019.01)

(52) U.S. Cl.
CPC .. *G06F 16/24542* (2019.01); *G06F 16/24565* (2019.01); *G06F 16/9024* (2019.01)

(58) Field of Classification Search
None
See application file for complete search history.

(56) References Cited

U.S. PATENT DOCUMENTS

| 2008/0019345 | A1* | 1/2008 | Wu ........................ H04W 16/10 370/341 |
| 2010/0010952 | A1* | 1/2010 | Kuhn ..................... G06Q 10/04 706/47 |
| 2014/0372408 | A1 | 12/2014 | Chishiro |
| 2017/0140281 | A1* | 5/2017 | Hillion ................... G06Q 40/03 |
| 2017/0163502 | A1* | 6/2017 | Macneil ................ H04L 41/145 |
| 2017/0220455 | A1* | 8/2017 | Badran ............... G06F 11/3684 |
| 2018/0096105 | A1* | 4/2018 | Bleicher ............... G06F 3/0484 |
| 2019/0325077 | A1* | 10/2019 | Haglin .................. G06K 9/6296 |
| 2019/0325078 | A1* | 10/2019 | Haglin ................. G06K 9/6201 |
| 2019/0384863 | A1* | 12/2019 | Sirin .................... G06V 10/776 |
| 2021/0216590 | A1* | 7/2021 | Delamare ........... G06F 16/2454 |
| 2021/0240705 | A1* | 8/2021 | Trigonakis .......... G06F 16/2471 |

FOREIGN PATENT DOCUMENTS

| JP | 2013-054602 A | 3/2013 |
| WO | 2013/111287 A1 | 8/2013 |

* cited by examiner

*Primary Examiner* — Christopher J Raab
(74) *Attorney, Agent, or Firm* — Fujitsu Patent Center

(57) ABSTRACT

A processor receives a search query for graph data representing a graph including nodes and edges, the search query specifying a search criterion. The processor determines whether a value of a first property associated with a first node matches the search criterion. The processor predicts whether a value of a second property associated with a second node matches the search criterion, in accordance with a result of the determining and a constraint rule between the first node and the second node. The processor generates a search result for the search query in accordance with the result of the determining and a result of the predicting.

9 Claims, 14 Drawing Sheets

SEARCH METHOD AND SEARCH APPARATUS FOR SEARCHING GRAPH DATA BASED ON SEARCH QUERY

CROSS-REFERENCE TO RELATED APPLICATION

This application is based upon and claims the benefit of priority of the prior Japanese Patent Application No. 2020-030479, filed on Feb. 26, 2020, the entire contents of which are incorporated herein by reference.

FIELD

The embodiments discussed herein relate to search techniques for graph data.

BACKGROUND

One type of data model for databases is graph data that represents a graph including a plurality of nodes and edges connecting the nodes. For example, a resource description framework (RDF) expresses information about a resource in three parts (may be called a triple): subject, predicate, and object. The resource represents an entity such as a human, an organization, or a machine. The subject is a resource representing a target entity. The predicate is a relationship between the subject and the object and may be called an attribute or a property. The object is another resource to which the subject is related or a literal. The literal is a text such as a value or a character string. For example, a triple (A, Age, 60) means that the age of person A is 60. A triple (A, Child, B) means that a child of person A is person B. The subject and object in the RDF correspond to nodes in a graph, and the predicate in the RDF corresponds to an edge in the graph.

Graph data may be used for searching for nodes that match specified search criteria. A search query includes one or more search criteria for narrowing down nodes. In general, in the case where a search query includes two or more search criteria, these two or more search criteria axe combined in a logical conjunction (AND operation). Search queries are written in a prescribed query language. For example, a search query for searching RDF data for resources may be written in a query language called SPARQL protocol and RDF query language (SPARQL). In a search query in SPARQL, search criteria for narrowing down resources are written in a triple pattern using a predicate value and an object value. For example, a search criterion specifying a predicate "Age" and an object "less than 40" means that resources are narrowed down to resources representing people whose ages are less than 40.

There has been proposed a graph pattern match system for accelerating RDF database searching. This proposed graph pattern matching system searches an RDF database using specified graph patterns and saves their respective search results in advance. When receiving a search query from a user, the graph pattern matching system extracts data that matches the search criteria included in the search query, using the saved search results.

For example, related arts are disclosed in Japanese Laid-open Patent Publication No. 2013-54602.

SUMMARY

According to one aspect, there is provided a non-transitory computer-readable storage medium storing a computer program that causes a computer to perform a process including: receiving a search query for graph data representing a graph including nodes and edges connecting the nodes, the nodes being associated with values of properties, the search query specifying a search criterion for searching the nodes by using a value of a property; determining whether a value of a first property associated with a first node of the nodes matches the search criterion; predicting whether a value of a second property associated with a second node of the nodes matches the search criterion, in accordance with a result of the determining and a constraint rule between the first node and the second node; and generating a search result for the search query in accordance with the result of the determining and a result of the predicting.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter, some embodiments will be described with reference to the accompanying drawings.

Figure 1:
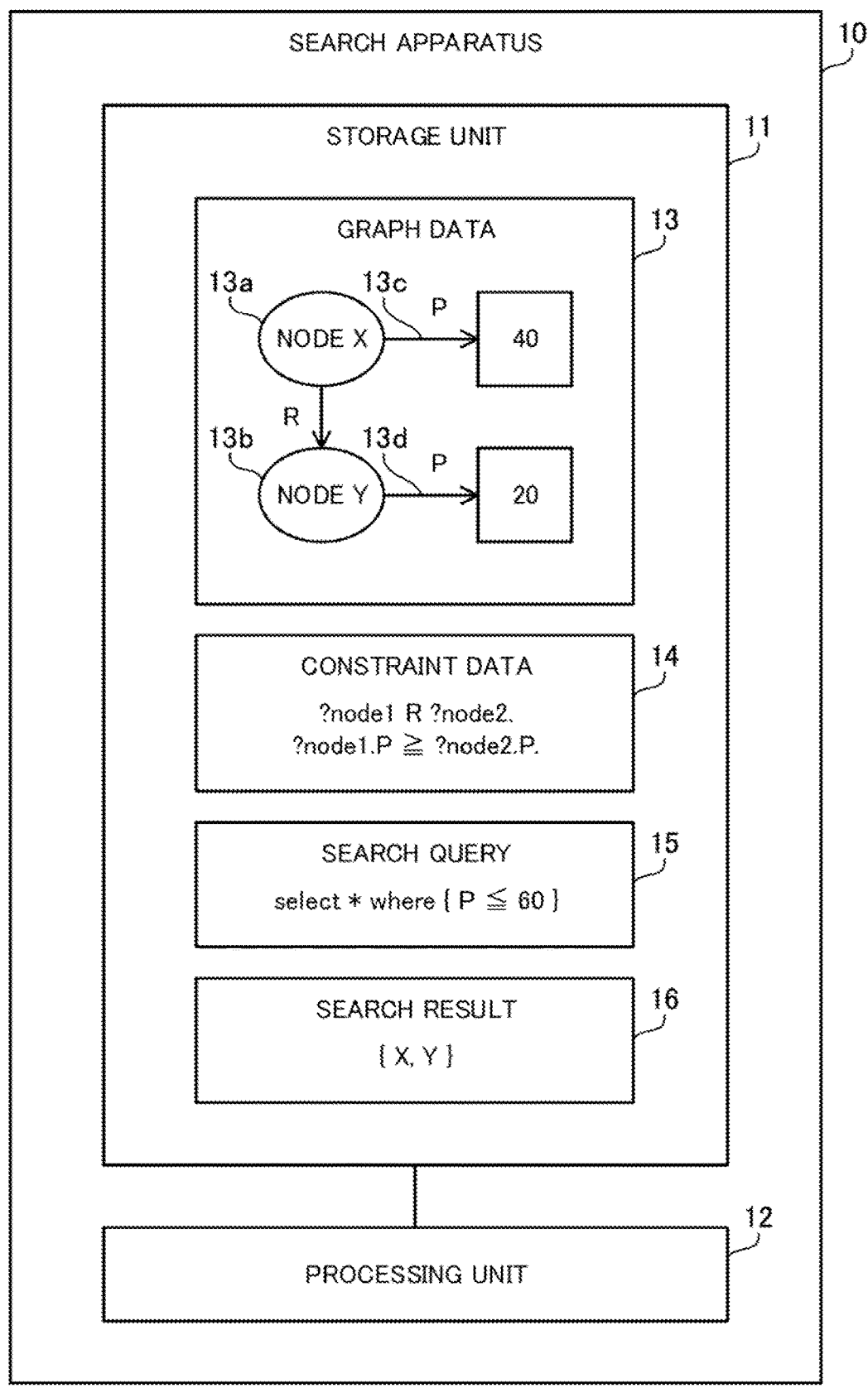
FIG. 1 is a view for explaining an example of a search apparatus according to a first embodiment.

A first embodiment will be described. FIG. 1 is a view for explaining an example of a search apparatus according to the first embodiment.

In performing a search process of graph data in response to a search query, comprehensive determination of whether each node in a graph matches the search criteria takes more search time with an increase in the scale of the graph. In this regard, there is room for accelerating the graph data searching if partial nodes are omissible from the determination of whether these nodes match the search criteria without causing a change in the search result, The search apparatus 10 of the first embodiment performs a search process of a graph database in response to a search query. The search apparatus 10 may be a client apparatus or a server apparatus. The search apparatus 10 may be called an information processing apparatus or a computer.

The search apparatus 10 includes a storage unit 11 and a processing unit 12. The storage unit 11 may be a volatile semiconductor memory such as a random access memory (RAM), or a non-volatile storage device such as a hard disk drive (HDD) or a flash memory. The processing unit 12 is a processor such as a central processing unit (CPU), a graphics processing unit (GPU), or a digital signal processor (DSP), for example. In this connection, the processing unit 12 may include an application-specific electronic circuit such as an application-specific integrated circuit (ASIC) or a field programmable gate array (FPGA). The processor executes programs stored in a memory such as a RAM (may be the storage unit 11). A set of multiple processors may be a "multiprocessor" or simply a "processor."

The storage unit 11 stores therein graph data 13 and constraint data 14.

The graph data 13 represents a graph including a plurality of nodes and a plurality of edges connecting the plurality of nodes. The plurality of nodes are each associated with values of one or more properties. The graph represented by the graph data 13 may be a directed graph with one-way edges. Alternatively, the graph data 13 may be RDF data written in RDF. For example, the nodes included in the graph data 13 correspond to resources that represent entities such as humans, organizations, and machines, and the edges included therein correspond to the relationships among the resources, such as parent-child relationships and inclusion relationships. Edges may represent one type of properties. The properties associated with a node are attributes of a resource, such as age, population, and area, for example.

As an example, the graph data 13 includes a node 13a (node X) and a node 13b (node Y). The nodes 13a and 13b are connected by an edge representing a relationship R. In this connection, the node 13b only needs to exist within a prescribed range from the node 13a. The nodes 13a and 13b may be connected, not directly but via one or more intermediate nodes. The node 13a is associated with the value of at least a property 13c (first property). The node 13b is associated with the value of at least a property 13d (second property). The property 13c and the property 13d may be the same or different. As an example, the nodes 13a and 13b represent humans, the edge between the nodes 13a and 13b represents a parent-child relationship, and the properties 13c and 13d represent age. In this case, it is represented that a child of person X is person Y, the age of person X is 40, and the age of person Y is 20.

The constraint data 14 defines constraint rules that the graph data 13 is expected to satisfy. The constraint rules are design information that is given to the data structure definitions of a database so as not to register semantically impossible data in the database. It is considered that, if data that does not satisfy the constraint rules is registered in the graph data 13, this data registration is rejected. Further, it is considered that it is confirmed whether the graph data 13 includes data that does not satisfy the constraint rules, and an error is reported if data that does not satisfy the constraint rules is found. Still further, it is considered that a search query specifying a search criterion that is inconsistent with the constraint rules is rejected. The first embodiment uses the constraint data 14 for accelerating the search process, as will be described later.

The constraint rules include a constraint rule per property and a constraint rule between nodes. The constraint rule per property is used to determine whether the value itself of one property of one node satisfies the constraint rule. The constraint rule between nodes is used to determine whether the relationship between the values of properties of different nodes satisfies the constraint rule. Examples of the constraint rule per property are that an Age value is a non-negative integer and that a Gender value is either "Male" or "Female." Examples of the constraint rule between nodes are that with respect to people with a parent-child relationship, the age of the child is less than or equal to that of the parent and that with respect to administrative districts with an inclusion relationship, the population of the subordinate administrative district is less than or equal to that of the superior administrative district. The first embodiment uses the constraint rules for accelerating the search process.

The constraint data 14 defines a constraint rule between a certain node (one node) and a different node (another node) existing within a prescribed range from the one node. For example, the other node within the prescribed range is an adjacent node that is reachable from the one node via one edge representing a prescribed relationship. Alternatively, for example, the other node within the prescribed range is a neighboring node that is reachable from the one node via one or more edges that represent a prescribed relationship only. The constraint data 14 defines a constraint rule between the value of the property 13c associated with the one node and the value of the property 13d associated with the other node.

As an example, the constraint data 14 defines the following constraint rule: when the one node and the other node are connected by an edge representing a relationship R, the value of the property 13d of the other node is less than or equal to the value of the property 13c of the one node. In the case where the relationship R is a parent-child relationship, the properties 13c and 13d may be interpreted to be age. In the case where the relationship R is an inclusion relationship between administrative districts, the properties 13c and 13d may be interpreted to be population or area.

The processing unit 12 obtains a search query 15. The processing unit 12 may receive the search query 15, as user input or from another information processing apparatus. The search query 15 is a search request for searching the graph data 13 for nodes and includes a search criterion specified using a value of a property. The search criterion may specify that the values of the properties 13c and 13d are greater than or equal to a threshold or less than or equal to the threshold. For example, the search query 15 may be to search for nodes representing people whose ages are greater than or equal to a threshold or to search for nodes representing administrative districts whose populations are greater than or equal to a threshold. The search criterion may include two or more criterion items corresponding to two or more properties. In general, these two or more criterion items are combined in a logical conjunction (as AND conditions).

After that, the processing unit 12 determines whether the value of the property 13c associated with the node 13a included in the graph data 13 matches the search criterion specified by the search query 15. After this determination regarding the property 13c of the node 13a, the processing unit 12 detects the node 13b existing within the prescribed range from the node 13a. Then, the processing unit 12 presumes whether the value of the property 13d associated with the node 12b matches the search criterion, on the basis of the determination result regarding the property 13c of the node 13a and the constraint rule defined by the constraint data 14. Depending on this presumption, it may be possible to omit the determination regarding the property 13d of the node 13b. The processing unit 12 generates a search result 16 for the search query 15 on the basis of the determination result regarding the property 13c of the node 13a and the presumption result regarding the property 13d of the node 13b.

For example, assume that the search query 15 specifies the following search criterion: the values of the properties 13c and 13d are less than or equal to a threshold. In addition, assume that the constraint data 14 defines the following constraint rule: with respect to one node and another node connected to each other with a relationship R, the value of the property 13d of the other node is less than or equal to the value of the property 13c of the one node. In this case, the following positive transitive relation is established under the constraint rule: if the value of the property 13c of the one node is less than or equal to the threshold, the value of the property 13d of the other node is less than or equal to the threshold. Therefore, if the value of the property 13c of the node 13a matches the search criterion, it is presumed that the value of the property 13d of the node 13b also matches the search criterion. As a result, information indicating the nodes 13a and 13b is included in the search result 16, for example.

As another example, assume that the search query 15 specifies the following search criterion: the values of the properties 13c and 13d are greater than or equal to a threshold. In addition, assume that the constraint data 14 defines the following constraint rule: with respect to one node and another node connected to each other with a relationship R, the value of the property 13d of the other node is lees than or equal to the value of the property 13c of the one node. In this case, the following negative transitive relation is established under the constraint rule: if the value of the property 13c of the one node is not greater than or equal to the threshold, the value of the property 13d of the other node is not greater than or equal to the threshold. Therefore, if the value of the property 13c of the node 13a does not match the search criterion, it is presumed that the value of the property 13d of the node 13b also does not match the search criterion. As a result, information indicating the nodes 13a and 13b is excluded from the search result 16, for example.

In this connection, at the time it is presumed that the value of the property 13d of the node 13b does not match the search criterion, the node 13b is excluded from the search result 16. In this case, even if the search criterion specified by the search query 15 includes other criteria relating to other properties, the processing unit 12 may omit determinations regarding the other properties of the node 13b. In addition, in the case where another node is further detected from the node 13b via an edge representing the relationship R, the processing unit 12 may omit a determination regarding the property 13d associated with the other node in a chain reaction. In addition, in the case where the search criterion specified by the search query 15 include a criterion item relating to a property involved in the constraint data 14 and a criterion item relating to a property that is not involved in the constraint data 14, the processing unit 12 may sort the criterion items so as to make a determination based on the former one prior to a determination based on the latter one.

As described above, in order to search the graph data 13 for nodes that match the search criterion specified by the search query 15, the search apparatus of the first embodiment refers to the constraint data 14, which is created for the graph data 13 in advance and defines constraint rules between different nodes. On the basis of the constraint rules and the result of determining whether the value of the property 13c of the node 13a matches the search criterion, the search apparatus 10 presumes whether the value of the property 13d of the node 13b existing within a prescribed range from the node 13a matches the search criterion, and omits the determination regarding the property 13d. This approach makes it possible to omit determinations regarding the properties of partial nodes without affecting the search result. Thus, the search process is accelerated even if the graph data 13 is large-scale data.

A second embodiment will now be described. A search apparatus of the second embodiment performs a search process of RDF data in response to a search query. The search apparatus of the second embodiment may be a client apparatus or a server apparatus. The search apparatus may be called an information processing apparatus or a computer.

Figure 2:
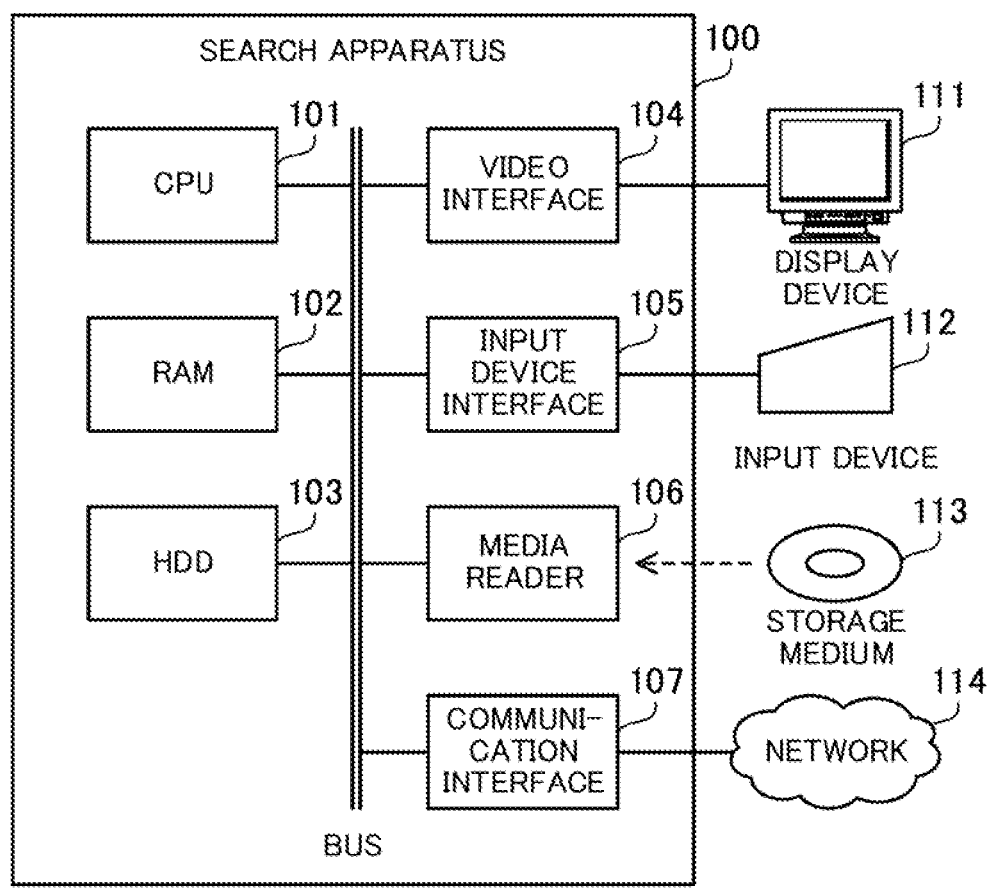
FIG. 2 illustrates an example of hardware configuration of a search apparatus according to a second embodiment.

FIG. 2 illustrates an example of hardware configuration of a search apparatus according to the second embodiment.

The search apparatus 100 includes a CPU 101, a RAM 102, an HDD 103, a video interface 104, an input device interface 105, a media reader 106, and a communication interface 107. These units in the search apparatus 100 are connected to a bus. The search apparatus 100 corresponds to the search apparatus 10 of the first embodiment. The CPU 101 corresponds to the processing unit 12 of the first embodiment. The RAM 102 or HDD 103 corresponds to the storage unit 11 of the first embodiment.

The CPU 101 is a processor that executes program instructions. The CPU 101 loads at least part of a program and data from the HDD 103 to the RAM 102 and executes the program. The CPU 101 may include a plurality of processor cores, and the search apparatus 100 may include a plurality of processors. A set of multiple processors may be called a "multiprocessor" or simply a "processor."

The RAM 102 is a volatile semiconductor memory that temporarily stores a program that is run by the CPU 101 and data that is used by the CPU 101 in processing. The search apparatus 100 may include another type of memory than RAM or may include a plurality of memories.

The HDD 103 is a non-volatile storage device that stores software programs such as operating system (OS), middleware and application software, and data. In this connection, the search apparatus 100 may include another type of storage device, such as flash memory or a solid state drive (SSD), or may include a plurality of storage devices.

The video interface 104 outputs videos to a display device 111 connected to the search apparatus 100 in accordance with instructions from the CPU 101. The display device 111 may be any type of display device such as a cathode ray tube (CRT) display, a liquid crystal display (LCD), organic electro-luminescence (OEL) display, or a projector. Another output device than the display device 111, such as a printer, may be connected to the search apparatus 100.

The input device interface 105 receives an input signal from an input device 112 connected to the search apparatus 100. As the input device 112, any type of input device such as a mouse, touch panel, a touch pad, or a keyboard may be used. In addition, plural types of input devices may be connected to the search apparatus 100.

The media reader 106 is a reading device that reads programs and data from a storage medium 113. As the storage medium 113, any type of storage medium may be used, such as a magnetic disk, an optical disc, or a semiconductor memory. Examples of the magnetic disk include a flexible disk (FD) and an HDD, and examples of the optical disc include a compact disc (CD) and a digital versatile disc (DVD). For example, the media reader 106 copies a program or data read from the storage medium 113 to another storage medium such as the RAM 102 or HDD 103. The read program is run by the CPU 101, for example. In this connection, the storage medium 113 may be a portable storage medium and may be used for distribution of the program and data. In addition, the storage medium 113 and HDD 103 may be called computer-readable storage media.

The communication interface 107 is connected to a network 114 and communicates with other information processing apparatuses over the network 114. The communication interface 107 may be a wired communication interface that is connected to a wired communication device, such as a switch or a router, or may be a wireless communication interface that is connected to a wireless communication device, such as a base station or an access point.

Figure 3:
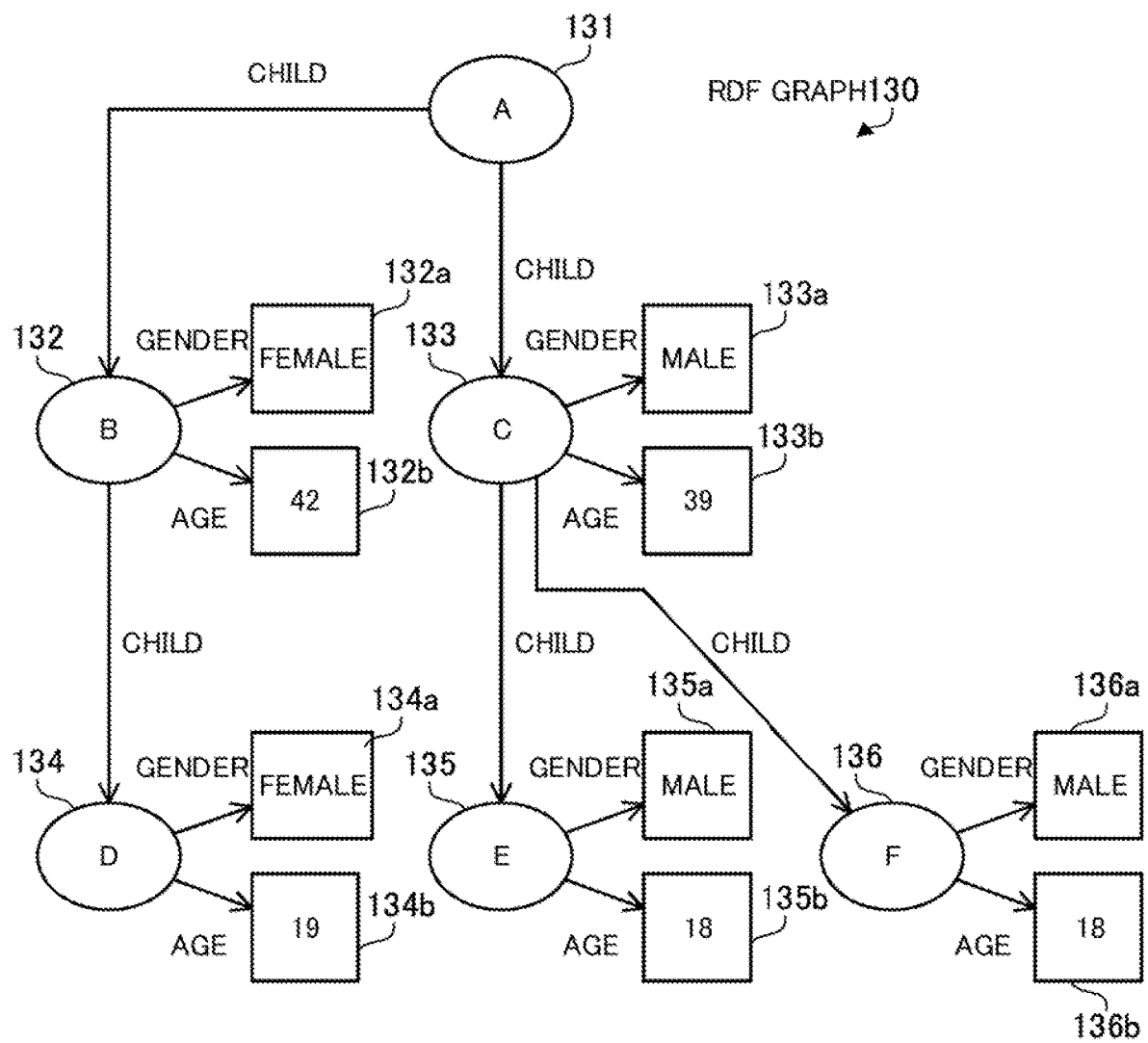
FIG. 3 illustrates an example of an RDF graph.

The following describes the data structure of a database. FIG. 3 illustrates an example of an RDF graph.

The RDF graph 130 is a graph representation of RDF data. In RDF, one fact is represented by a triple (subject, predicate, object). The subject is a resource representing an entity such as a human, an organization, or a machine. The resource is identified by a uniform resource identifier (URI), which is an identifier. The predicate is a relationship between the subject and the object and may he called an attribute or a property. The object is another resource to which the subject is related or a literal. The literal is a text such as a value or a character string. Resources and literals in the RDF correspond to nodes in a graph. The resources may be depicted by ellipses, whereas the literals may be depicted by rectangles. Properties in the RDF correspond to edges in the graph. Each edge is directed from a subject to an object.

The second embodiment uses RDF data that describes blood relationships among people. The RDF graph 130 includes nodes 131, 132, 133, 134, 135, and 136 that represent resources. In addition, the RDP graph 130 includes nodes 132a, 132b, 133a, 133b, 134a, 134b, 135a, 135b, 136a, and 136b that represent literals.

The node 131 represents person A, the node 132 represents person B, the node 133 represents person C, the node 134 represents person D, the node 135 represents person E, and the node 136 represents person F. An edge representing a property "Child" is directed from the node 131 to the node 132. An edge representing the property "Child" is directed from the node 131 to the node 133. An edge representing the property "Child" is directed from the node 132 to the node 134. An edge representing the property "Child" is directed from the node 133 to the node 135. An edge representing the property "Child" is directed from the node 133 to the node 136.

An edge representing a property "Gender" is directed from the node 132 to the node 132a representing a literal "Female." An edge representing a property "Age" is directed from the node 132 to the node 132b representing a literal "42." An edge representing the property "Gender" is directed from the node 133 to the node 133a representing a literal "Male." An edge representing the property "Age" is directed from the node 133 to the node 133b representing a literal "39." An edge representing the property "Gender" is directed from the node 134 to the node 134a representing a literal "Female." An edge representing the property "Age" is directed from the node 134 to the node 134b representing a literal "19." An edge representing the property "Gender" is directed from the node 135 to the node 135a representing a literal "Male." An edge representing the property "Age" is directed from the node 135 to the node 135b representing a literal "18." An edge representing the property "Gender" is directed from the node 136 to the node 136a representing a literal "Male." An edge representing the property "Age" is directed the node 136 to the node 136b representing a literal "18."

Therefore, the RDF graph 130 represents the following facts: person B is a child of person A and is a woman of 42 years old; person C is a child of person A and is a man of 39 years old; person D is a child of person B and is a woman of 19 years old; person E is a child of person C and is a man of 18 years old; and person F is a child of person C and is a man of 18 years old.

Figure 4:
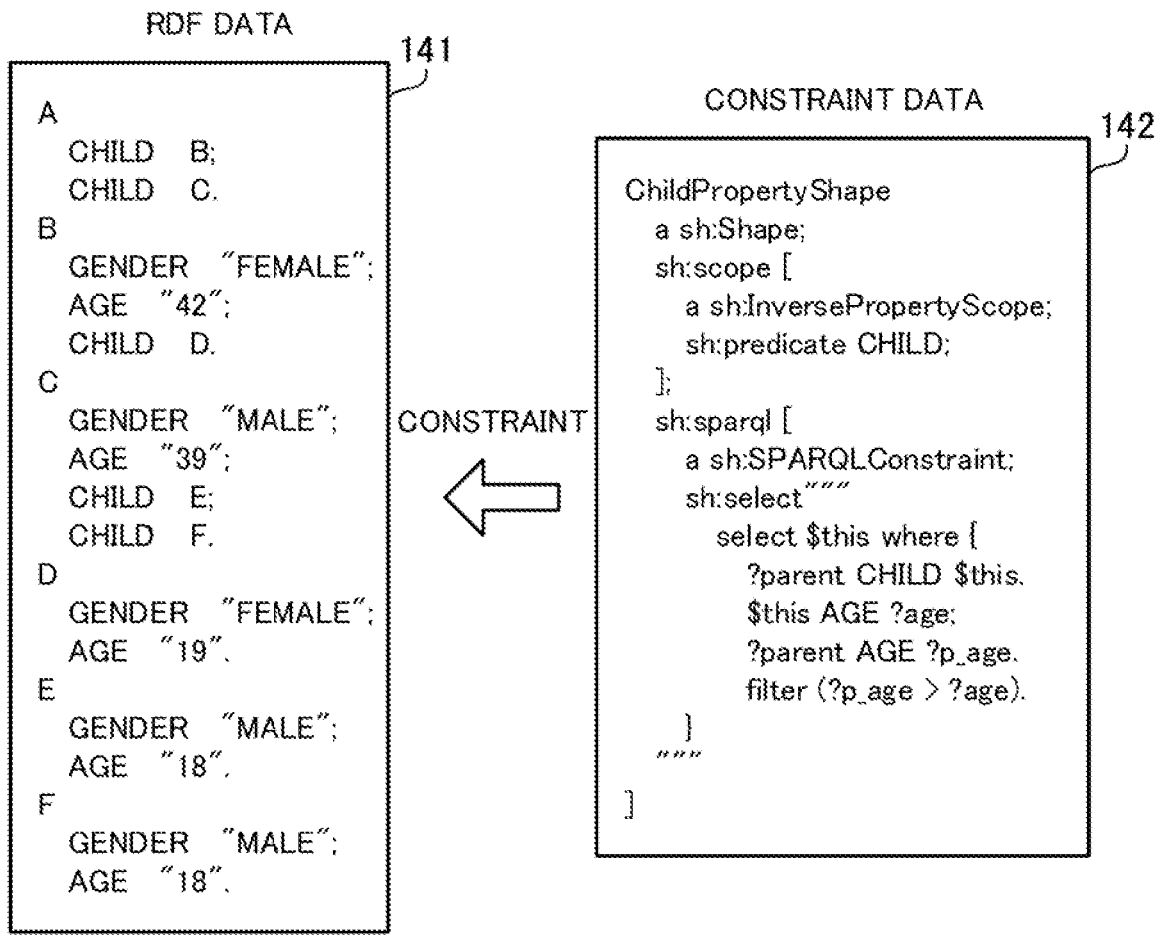
FIG. 4 illustrates an example of RDF data and constraint data.

FIG. 4 illustrates an example of RDF data and constraint data. The RDF data 141 corresponds to the RDF graph 130 of FIG. 3. The RDF data 141 includes 15 triples representing the following facts: (1) a child of person A is person B; (2) a child of person A is person C; (3) the gender of person B is female; (4) the age of person B is 42; (5) a child of person B is person D; (6) the gender of person C is male; (7) the age of person C is 39; (8) a child of person C is person E; (9) a child of person C is person F; (10) the gender of person D is female; (11) the age of person D is 19; (12) the gender of person E is male; (13) the age of person E is 18; (14) the gender of person F is male; and (15) the age of person F is 18.

For the RDF data 141, constraint data 142 is created in advance at the time of designing its data structure. The constraint data 142 defines constraint rules that are imposed on the RDF data 141 for rejecting the registration of semantically impossible data in the RDF data 141. The constraint data 142 is written in a constraint language such as shapes constraint language (SHACL). The constraint rules include a constraint rule per property, which is imposed on the value of one property of one resource, independently of the other resources and the other properties. The constraint rules also include a constraint rule between resources, which is imposed on the relationship between the value of a property of a resource and the value of a property of another resource. Using a relational database (RDB), constraint rules each for one column in one record are definable. By contrast, using an RDF database, constraint rules between different resources are definable.

The constraint rules are referred to when new data is registered in the RDF data 141. It is considered that, if data that is inconsistent with the constraint rules is registered in the RDF data 141, the registration of the data is rejected. For example, the registration of a triple in which gender is neither "Male" nor "Female" and a triple in which age is not a non-negative integer is rejected. Further, the constraint rules are referred to when the data registered in the RDF data 141 is confirmed at a later time. It is considered that, if data that is inconsistent with the constraint rules is detected in the RDF data 141, an error message is displayed so as to promote a correction of the RDF data 141.

Still further, the constraint rules are referred to when a search query received is confirmed. It is considered that, if the search query includes a search criterion that specifies a valve inconsistent with the constraint rules, the search process requested by the search query is rejected. In this case, a search result indicating that no data has been found may be output without the search process actually performed. For example, a search query including a search criterion specifying a value that is neither "Male" nor "Female" for gender and a search query including a search criterion specifying a value that is not a non-negative integer for age are rejected.

The constraint data 142 defines the following constraint rule between resources: a child's age is less than a parent's age. The RDF data 141 is created so as to satisfy this constraint rule. The first row in the constraint rule illustrated in FIG. 4 indicates that a certain resource is taken as "parent" and a resource that is reached via a property "Child" is taken as "this." The second row indicates that the age of the resource "this" is taken as "age." The third row indicates the age of the resource "parent" is taken as "p_age." The fourth row indicates that the age "p_age" is greater than the age "age." The above defines that a child's age is less than a parent's age. The second embodiment uses such a constraint rule between resources for accelerating a search process, as will be described later.

The following describes a search process for a search query. First, a simple search process of the RDF data 141 will be described, and then the acceleration of the search process will be described.

Figure 5:
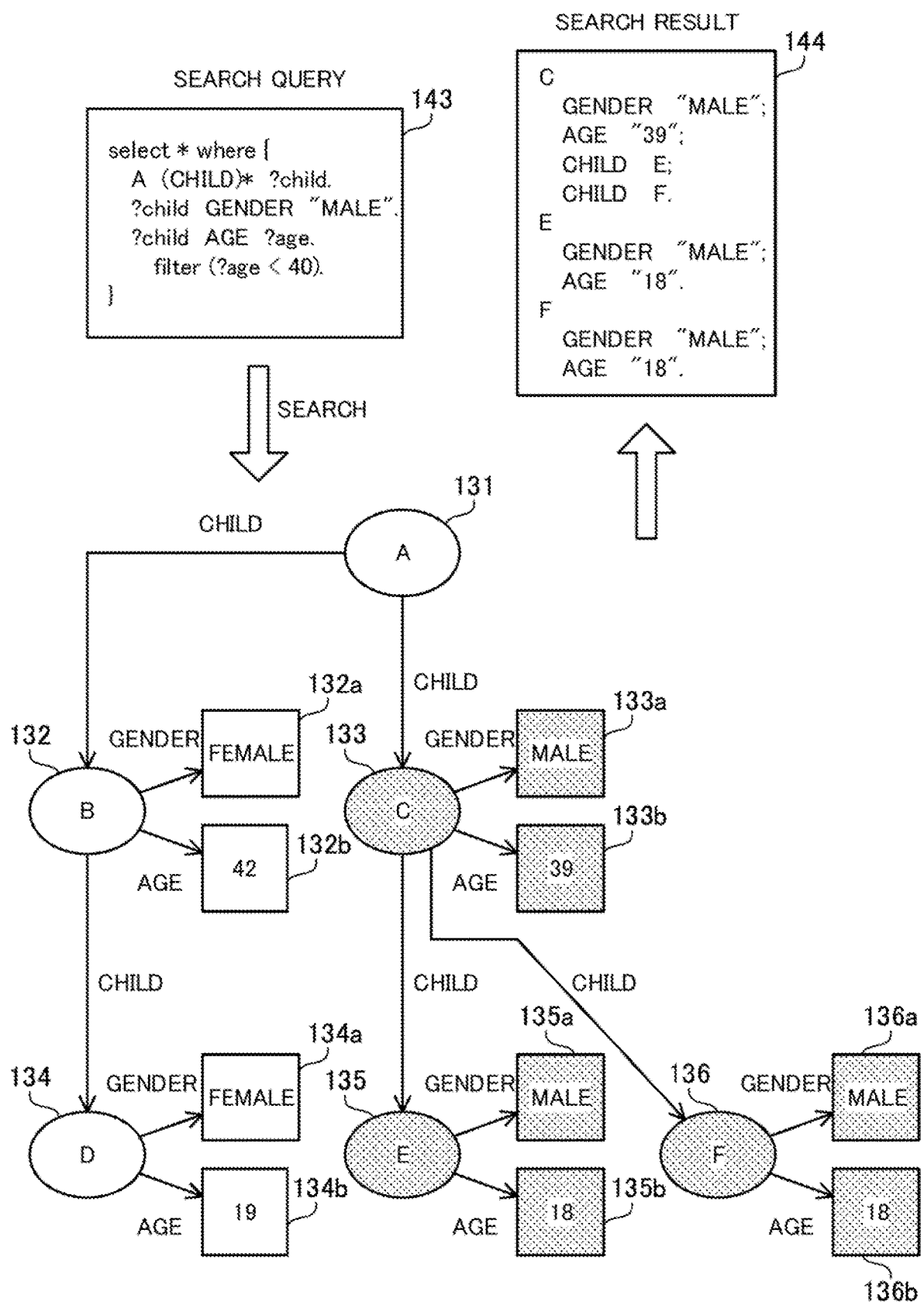
FIG. 5 illustrates a first example of a search query and a search result.

FIG. 5 illustrates a first example of search query and a search result. The search query 143 is a database query that is a request to search the RDF data 141 for resources that match search criteria. The search apparatus 100 may receive the search query 143, as user input or from another information processing apparatus. The search query 143 is written in SPARQL.

The search query 143 includes three search criteria. These search criteria are combined in a logical conjunction (as AND conditions). The first search criterion is that resources to be extracted are reachable from a resource representing person A on a path with a property "Child." The second search criterion is that resources to be extracted have "Male" as the value of a property "Gender." The third search criterion is that resources to be extracted have a value less than 40 as the value of a property "Age." The first row in the search criteria illustrated in FIG. 5 describes that a resource that is reached from the resource representing person A on a path with the property "Child" is taken as "Child." The second row describes that the gender of the "Child" resource needs to be "Male." The third row describes that the age of the "Child" resource is taken as "Age." The fourth row describes that the age "Age" needs to be less than 40. In short, the search query 143 is to search for men whose ages are less than 40 from the descendants of person A.

According to a simple search process, the base node 131 is first selected, and then under the first search criterion, the nodes 132, 133, 134, 135, and 136 that are reached from the node 131 via one or more edges representing the property "Child" are extracted.

Then, under the second search criterion, each of the nodes 132, 133, 134, 135, and 136 is checked to determine whether the value of the property "Gender" is "Male." That is, the node 132*a* corresponding to the node 132 is extracted and checked to determine whether its value is "Male." Similarly, the node 133*a* corresponding to the node 133 is extracted and checked to determine whether its value is "Male." The node 134*a* corresponding to the node 134 is extracted and checked to determine whether its value is "Male." The node 135*a* corresponding to the node 135 is extracted and checked to determine whether its value is "Male." The node 136*a* corresponding to the node 136 is extracted and checked to determine whether its value is "Male." Among the nodes 131, 132, 133, 134, 135, and 136, nodes that do not match the second search criterion are excluded from a search result. That is, the nodes 132 and 134 that do not have "Male" as the value of the property "Gender" are excluded from the search result.

Then, under the third search criterion, each of the remaining nodes 133, 135, and 136 is checked to determine whether the value of the property "Age" is less than 40. That is, the node 133*b* corresponding to the node 133 is extracted and checked to determine whether its value is less than 40. Similarly, the node 135*b* corresponding to the node 135 is extracted and checked to determine whether its value is less than 40. The node 136*b* corresponding to the node 136 is extracted and checked to determine whether its value is less than 40. Among the nodes 133, 135, and 136, nodes that do not match the third search criterion are excluded from the search result. At this time, no node is excluded.

The nodes 133, 135, and 136 finally remain. Then, a search result 144 for the search query 143 is generated. The search result 144 includes triples having the resource indicated by each node 133, 135, and 136 as a subject. More specifically, the search result 144 includes eight triples representing the following facts: (1) the gender of person C is male; (2) the age of person C is 39; (3) a child of person C is person E; (4) a child of person C is person F; (5) the gender of person E is male; (6) the age of person E is 18; (7) the gender of person F is male; and (8) the age of person F is 18.

In the above search process, the determination under the second search criterion is made on the five literals represented by the nodes 132*a*, 133*a*, 134*a*, 135*a*, and 136*a*. In addition, the determination under the third search criterion is made on the three literals represented by the nodes 133*b*, 135*b*, and 136*b*. Therefore, the determination is made on a total of eight literals.

Figure 6:
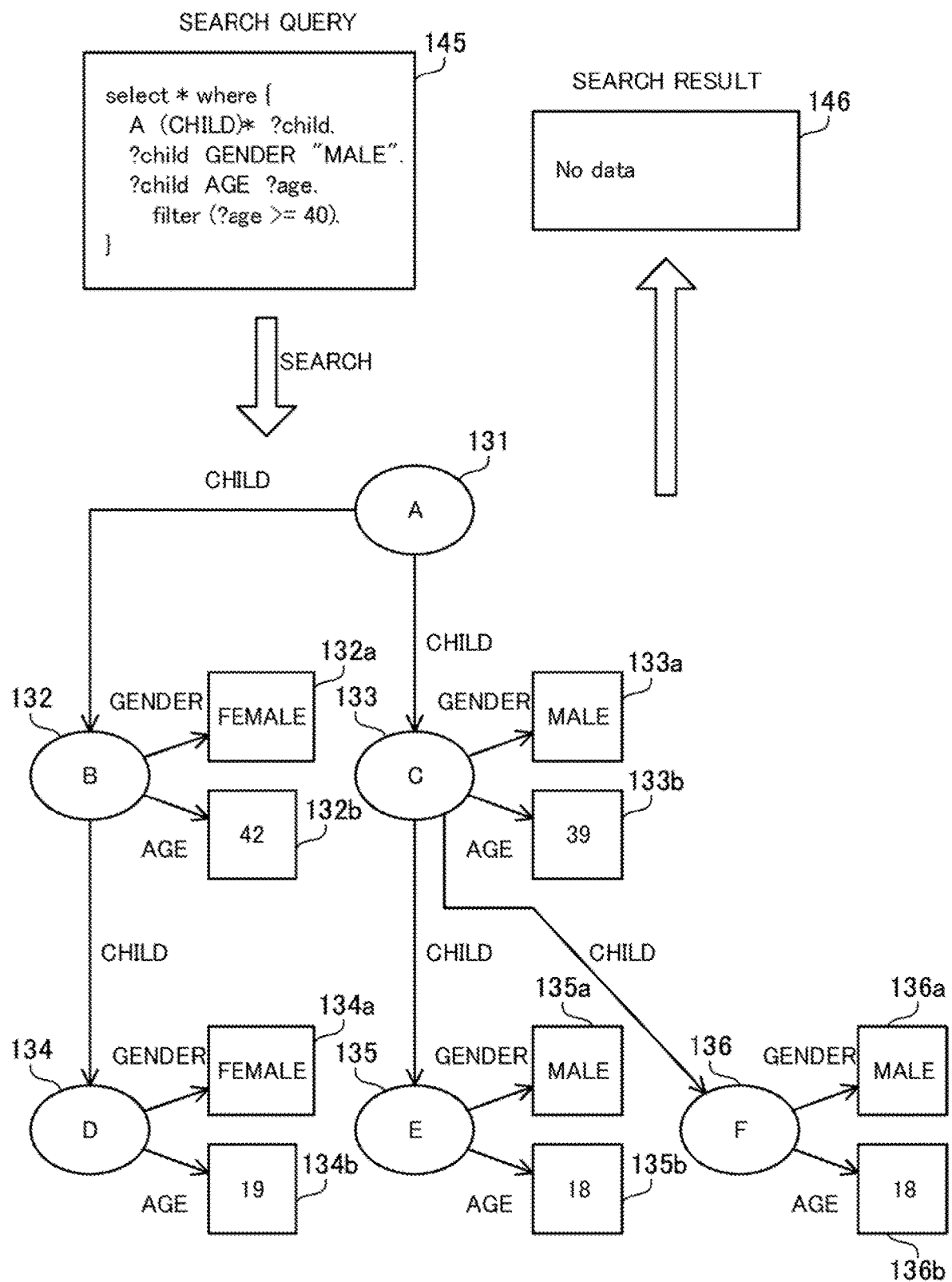
FIG. 6 illustrates a second example of a search query and a search result.

FIG. 6 illustrates a second example of a search query and a search result. Similar to the search query 143, the search query 145 is a database query to search the RDF data 141 for resources. However, the search query 145 includes a third search criterion different from that of the search query 143 out of the three search criteria. The third search criterion of the search query 145 is that resources to be extracted have a value of 40 or greater as the value of the property "Age." That is, the search query 145 is to search for men whose ages are greater than or equal to 40 from the descendants of person A.

According to a simple search process, the base node 131 is first selected, and then under the first search criterion, the nodes 132, 133, 134, 135, and 136 that are reached from the node 131 via one or more edges representing the property "Child" are extracted. Then, under the second search criterion, each of the nodes 132, 133, 134, 135, and 136 is checked to determine whether the value of the property "Gender" is "Male." As a result of this determination, the nodes 132 and 134 that do not have "Male" as the value of the property "Gender" are excluded from a search result. Then, under the third search criterion, each of the remaining nodes 133, 135, and 136 is checked to determine whether the value of the property "Age" is greater than or equal to 40. As a result of this determination, the nodes 133, 135, and 136, which do hot have a value of 40 or greater as the value of the property "Age," are excluded from the search result.

No nodes finally remain. A search result 146 for the search query 145 is generated accordingly. The search result 146 indicates that no triple has been found. According to the above-described search process, the determination under the second search criterion is made on the five literals represented by the nodes 132*a*, 133*a*, 134*a*, 135*a*, and 136*a*. In addition, the determination under the third search criterion is made on the three literals represented by the nodes 133*b*, 135*b*, and 136*b*. Therefore, the determination is made on a total of eight literals.

By contrast, considering the constraint rule defined by the constraint data 142, determinations on partial literals are omissible. For example, with respect to the third search criterion specified by the search query 143 illustrated in FIG. 5, if a parent's age is less than 40, it is obvious that a child's age is lees than 40, because the child's age is less than the parent's age. Therefore, in the case where the node 133*b* matches the third search criterion, it is presumed that the nodes 135*b* and 136*b* also match the third search criterion, and therefore it is possible to omit the determinations regarding the nodes 135*b* and 136*b*.

In addition, with respect to the third search criterion specified by the search query 145 of FIG. 6, if a parent's age is not greater than or equal to 40, it is obvious that a child's age is not greater than or equal to 40, because the child's age is less than the parent's age. Therefore, in the case where the node 133*b* does not match the third search criterion, it is presumed that the nodes 135*b* and 136*b* also do not match the third search criterion, and therefore it is possible to omit the determinations regarding the nodes 135*b* and 136*b*. Since the nodes 135 and 136 are excluded from the search result at this time, determinations regarding the other properties of the nodes 135 and 136 are no more needed accordingly.

Figure 7:
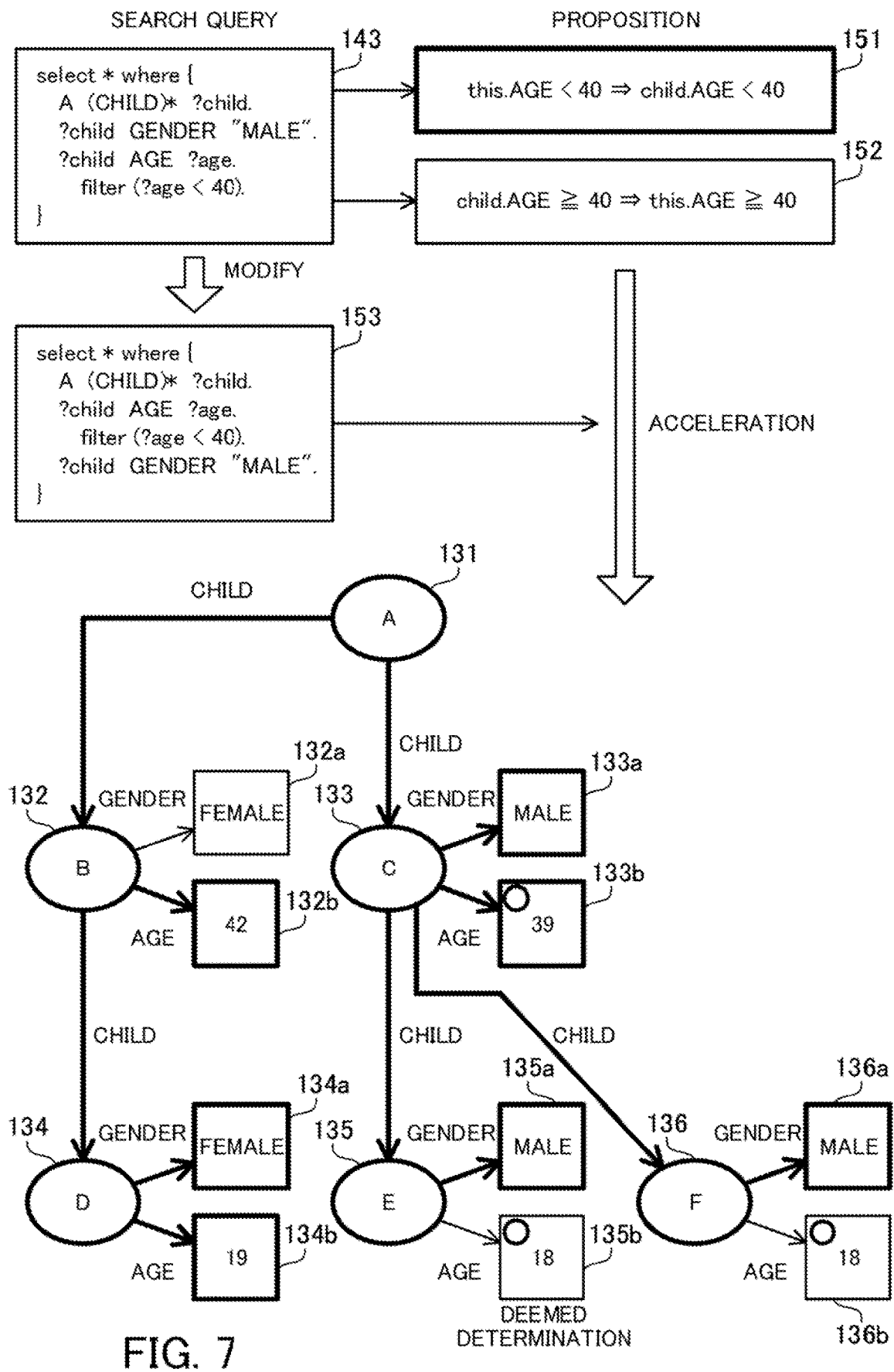
FIG. 7 illustrates a first example of accelerating a search process.

FIG. 7 illustrates a first example of accelerating a search process. Here, the acceleration of the search process performed in response to the search query 143 will be considered. The third search criterion specifying a range for the property "Age" is extracted from the search query 143 as a search criterion relating to a property involved in the constraint rule. On the basis of the search criterion and constraint rule, propositions 151 and 152 each indicating a transitive relation (implication) between adjacent resources are generated. The adjacent resources are two resources whose values of the property are compared under the constraint rule.

The proposition 151 is a positive proposition that is satisfied under the constraint rule between a modus ponens argument indicating that the value of the property of one resource matches the search criterion and a modus ponens argument indicating that the value of the property of the other resource matches the search criterion. One of the two modus ponens arguments serves as a premise and the other serves as a conclusion. On the basis of the third search criterion of the search query 143, a modus ponens argument in which a parent's age is less than 40 and a modus ponens argument in which a child's age is less than 40 are generated. Because of the constraint rule defining that a child's age is less than a parent's age, a proposition about a transitive relation (implication) in which, if a parent's age is less than 40, a child's age is less than 40 is generated as the proposition 151. Here, "a parent's age is less than 40" is a premise and "a child' s age is less than 40" is a conclusion.

The proposition 152 is a negative proposition between a modus tollens argument indicating that the value of the property of one resource does not match the search criterion and a modus tollens argument indicating that the value of the property of the other resource does not match the search criterion. One of the two modus tollens arguments serves as a premise and the other serves as a conclusion. The proposition 152 corresponds to a contraposition of the proposition 151.

On the basis of the third search criterion of the search query 143, a modus tollens argument indicating that a parent's age is greater than or equal to 40 and a modus tollens argument indicating that a child's age is greater than or equal to 40 are generated. Because of the constraint rule defining that a child's age is less than a parent's age, a proposition about a transitive relation (implication) in which, if a child's age is greater than or equal to 40, a parent's age is greater than or equal to 40 is generated as the proposition 152. "A child's age is greater than or equal to 40" is a premise, and "a parent's age is greater than or equal to 40" is a conclusion. Since the search query 143 requests forward-tracking for the property "Child" using a certain resource as a base, the proposition 151 out of the propositions 151 and 152 is used here.

In addition, by sorting the plurality of search criteria included in the search query 43, the search query 143 is modified to produce a search query 153. In the sorting of the search criteria, search criteria relating to properties that are involved in the constraint rule are moved prior to search criteria relating to properties that are not involved in the constraint rule. By doing so, a determination is first made under a search criterion relating to a property involved in the constraint rule. With respect to resources excluded from a search result as a result of the determination, it is no more needed to make determinations under the search criteria relating to properties that are not involved in the constraint rule. In the search query 143, the search criterion relating to the property "Gender" that is not involved in the constraint rule is the second, and the search criterion relating to the property "Age" that is involved in the constraint rule is the third. Therefore, in the search query 153, the placements of the second search criterion and the third search criterion of the search query 143 are exchanged.

Then, a search process is performed based on the search query 153 and proposition 151. First the base node 131 is selected, and then under the first search criterion of the search query 153, the nodes 132, 133, 134, 135, and 136 that are reached from the node 131 via one or more edges representing the property "Child" are extracted.

Then, under the second search criterion of the search query 153, the extracted nodes are checked, in order from the node closest to the base, to determine whether the value of the property "Age" is less than 40. First, the node 132*b* corresponding to the node 132 is extracted and checked to determine whether its value is than 40. Here, the value of the node 132*b* does not match the second search criterion. Therefore, the node 132 is excluded from the search result. Since the premise of the proposition 151 is not satisfied, the conclusion of the proposition 151 is not used.

Then, the node 133*b* corresponding to the node 133 is extracted and checked to determine whether its value is less than 40. Since the value of the node 133*b* matches the second search criterion, the premise of the proposition 151 is satisfied and the conclusion of the proposition 151 is used. As a result, with respect to the nodes 135 and 136 that are reached from the node 133 via one or more edges representing the property "Child," it is presumed that the values of the corresponding nodes 135*b* and 136*b* match the second search criterion, and thus the determinations regarding the nodes 135*b* and 136*b* are omitted (deemed determination). After that, the node 134*b* corresponding to the node 134 is extracted and checked to determine whether its value is less than 40. Since the value of the node 134*b* matches the second search criterion, the premise of the proposition 151 is satisfied, and the conclusion of the proposition 151 is used. In this connection, since there is no further node from the node 134, the deemed determination is not needed.

After that, under the third search criterion of the search query 153, the remaining nodes 133, 134, 135, and 136 are checked to determine whether their values of the property "Gender" are "Male." As a result of the determinations, the node 134 that does not have "Male" as the value of the property "Gender" is excluded from the search result. The nodes 133, 135, and 136 finally remain. This result is consistent with the search result 144 illustrated in FIG 5. In addition, the determinations on eight literals are made in the search process of FIG. 5, whereas the determinations on seven literals are made in the search process of FIG. 7. This means that the number of times of determination on a literal is reduced.

Figure 8:
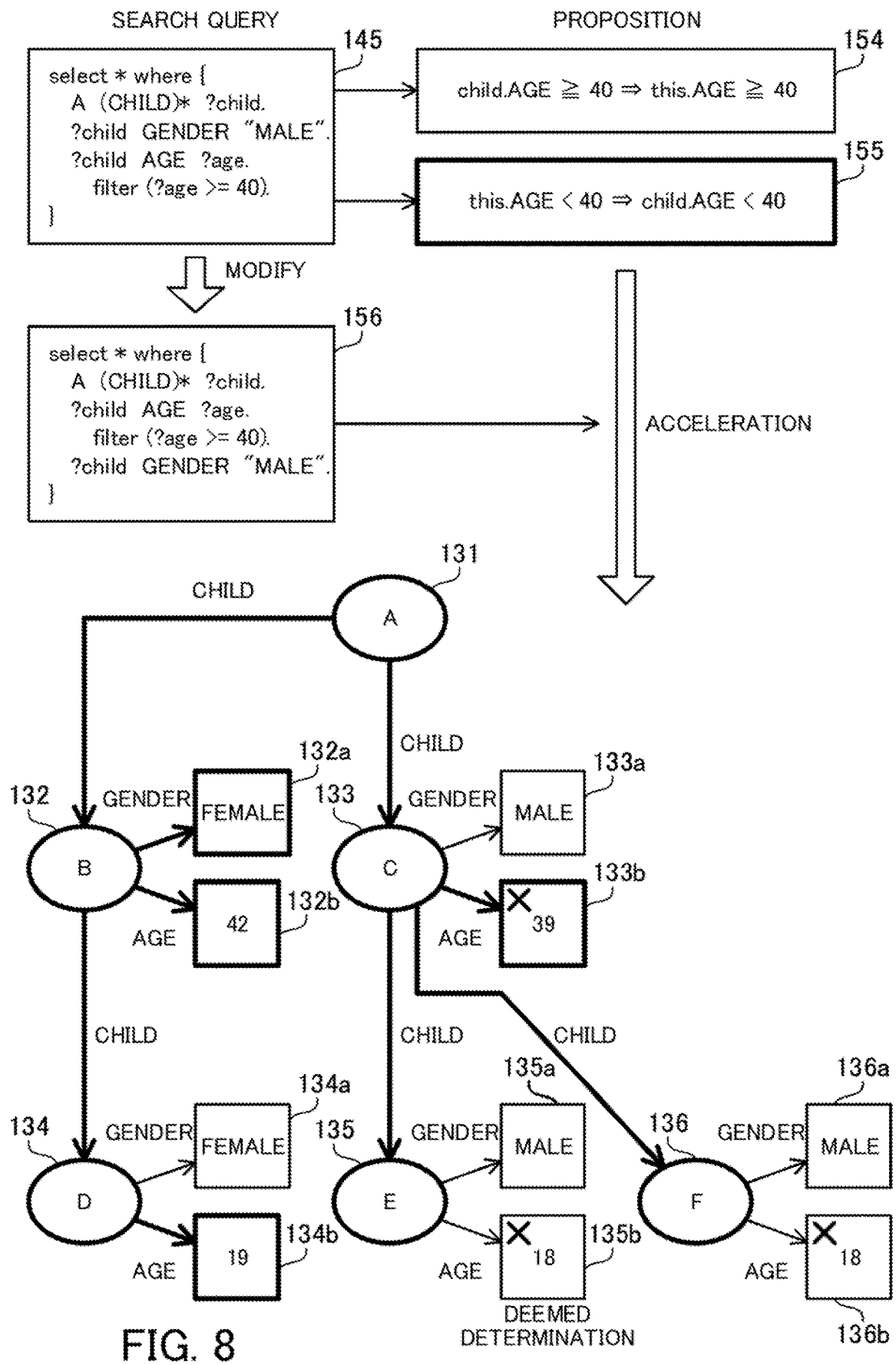
FIG. 8 illustrates a second example of accelerating a search process.

FIG. 8 illustrates a second example of accelerating a search process. Here, acceleration of the search process performed in response to the search query 145 will be considered. On the basis of the third search criterion of the search query 145 and the constraint rule, propositions 154 and 155 about transitive relations (implications) are generated. The proposition 154 is a positive proposition, whereas the proposition 155 is a negative proposition.

On the basis of the third search criterion of the search query 145, a modus ponens argument indicating that a parent's age is greater than or equal to 40 and a modus ponens argument indicating that a child's age is greater than or equal to 40 are generated. Under the constraint rule, a proposition indicating that, if a child's age is greater than or equal to 40, a parent's age is greater than or equal to 40 is generated as the proposition 154. In addition, on the basis of the third search criterion of the search query 145, a modus tollens argument indicating that a parent's age is less than 40 and a modus tollens argument indicating that a child's age is less than 40 are generated. Under the constraint rule, a proposition indicating that if a parent's age is less than 40, a child's age is less than 40 is generated as the proposition 155. Since the search query 145 requests forward-tracking for the property "Child," the proposition 155 out of the propositions 154 and 155 is used.

In addition, by sorting the plurality of search criteria included in the search query 145, the search query 145 is modified to produce a search query 156. In the search query 156, the placements of the second search criterion and the third search criterion in the search query 145 are exchanged.

Then, a search process is performed based on the search query 156 and proposition 155. First, the base node 131 is selected, and then under the first search criterion of the search query 156, the nodes 132, 133, 134, 135, and 136 that are reached from the node 131 via one or more edges representing the property "Child" are extracted. Then, under the second search criterion of the search query 156, the extracted nodes are checked, in order from the node closet to the base, to determine whether the value of the property "Age" is greater than or equal to 40. First, the node 132*b* corresponding to the node 132 is extracted and checked to determine whether its value is greater than or equal to 40. Since the value of the node 132*b* matches the second search criterion, the premise of the proposition 155 is not satisfied, and thus the conclusion of the proposition 155 is not used.

Then, the node 133*b* corresponding to the node 133 is extracted and checked to determine whether its value is greater than or equal to 40. Here, the value of the node 133*b* does not match the second search criterion. Therefore, the node 133 is excluded from the search result. Since the premise of the proposition 155 is satisfied, the conclusion of the proposition 155 is used. As a result, with respect to the nodes 135 and 136 that are reached from the node 133 via one or more edges representing the property "Child," it is presumed that the values of the corresponding nodes 135*b* and 136*b* do not match the second search criteria, and thus the determinations regarding the nodes 135*b* and 136*b* are omitted (deemed determination). The nodes 135 and 136 are excluded from the search result accordingly.

Then, the node 134*b* corresponding to the node 134 is extracted and checked to determine whether its value is greater than or equal to 40. Here the value of the node 134*b* does not match the second search criterion. Therefore, the node 134 is excluded from the search result. Since the premise of the proposition 155 is satisfied, the conclusion of the proposition 155 is used. Here, there is no further node from the node 134, and the deemed determination is not needed. Then, under the third search criterion of the search query 156, the remaining node 132 is checked to determine whether its value of the property "Gender" is "Male." As a result of this determination, the node 132 that does not have "Male" as the value of the property "Gender" is excluded from the search result.

No node finally remains. This is consistent with the search result 146 illustrated in FIG. 6. In addition, the determinations on eight literals are made in the search process of FIG. 6, whereas the determinations on four literals are made in the search of FIG. 8. This means that the number of times of determination on a literal is reduced. Especially, all determinations regarding all properties of the nodes 135 and 136 are omitted. As described above, in the case of using a positive proposition, determinations regarding partial properties of other resources that are reached from a resource currently processed are omitted. In addition, in the case of using a negative proposition, all determinations regarding all properties of other resources that are reached from a resource currently processed are omitted.

The following describes functions of the search apparatus 190 and a processing procedure thereof.

Figure 9:
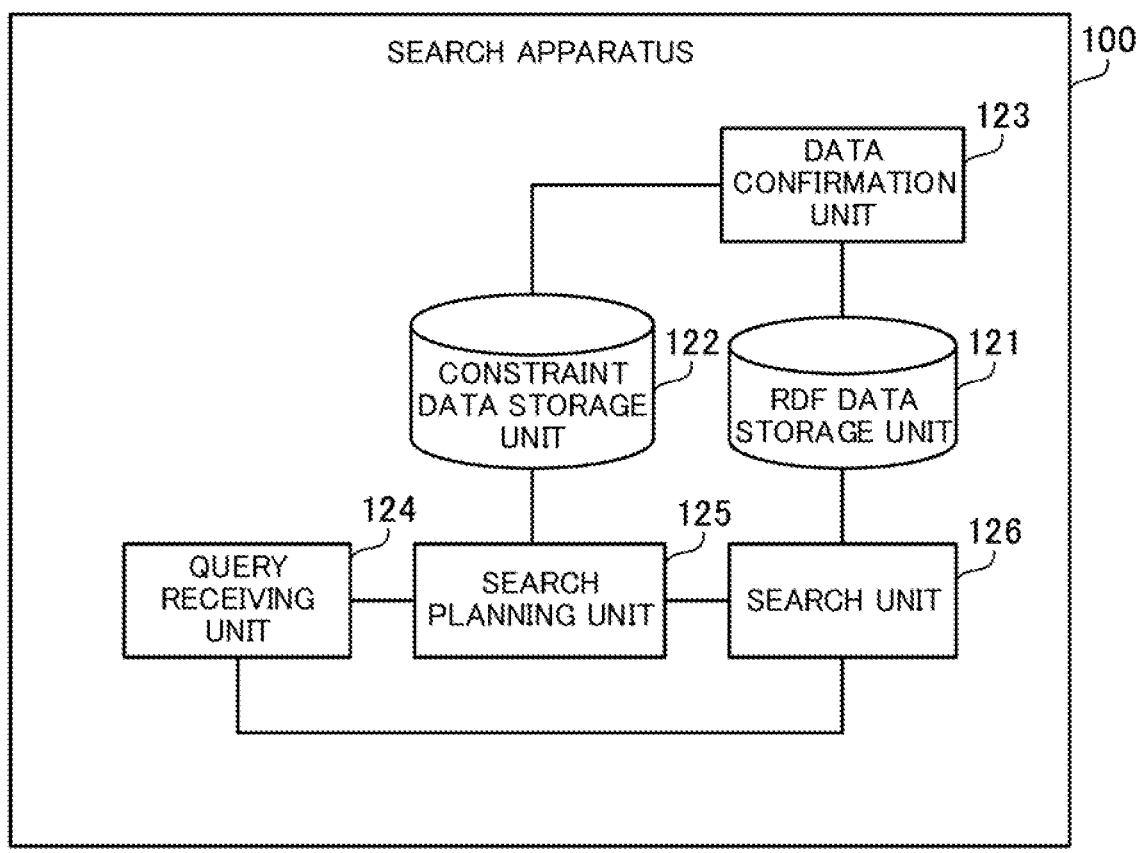
FIG. 9 is a block diagram illustrating an example of functions of the search apparatus.

FIG. 9 is a block diagram illustrating an example of functions of the search apparatus. The search apparatus 100 includes an RDF data storage unit 121 and a constraint data storage unit 122. These storage units are implemented by using a storage space of the RAM 102 or HDD 103, for example. The search apparatus 100 also includes a data confirmation unit 123, a query receiving unit 124, a search planning unit 125, and a search unit 126. These processing units are implemented by the CPU 101 executing a program, for example.

The RDF data storage unit 121 stores therein the RDF data 141. The RDF data storage unit 121 may be called an RDF database. The constraint data storage unit 122 stores therein the constraint data 142. The constraint data 142 is generated in advance at the time of database designing. The RDF data 141 and constraint data 142 may be obtained from another information processing apparatus.

The data confirmation unit 123 receives a confirmation command. The data confirmation unit 123 may receive the confirmation command, as user input or from another information processing apparatus. When receiving the confirmation command, the data confirmation unit 123 reads the constraint data 142 from the constraint data storage unit 122 and confirms whether the RDF data 141 stored in the RDF data storage unit 121 satisfies the constraint rules.

If all triples included in the RDF data 141 satisfy the constraint rules, the data confirmation unit 123 outputs a confirmation result indicating a confirmation success. If any of the triples included in the RDF data 141 does not satisfy the constraint rules, the data confirmation unit 123 outputs a confirmation result indicating an error. The confirmation result indicating the error may include information on the triple that does not satisfy the constraint rules. The data confirmation unit 123 may display the confirmation result on the display device 111, save it in the HDD 103, or send it to another information processing apparatus.

The query receiving unit 124 receives a search query. The query receiving unit 124 may receive the search query, as user input or from another information processing apparatus. The query receiving unit 124 outputs the received search query to the search planning unit 125. The query receiving unit 124 also obtains a search result for the search query from the search unit 126 and outputs the search result. The query receiving unit 124 may display the search result on the display device 111, save it in the HDD 103, or send it to another information processing apparatus.

The search planning unit 125 analyzes the search query obtained from the query receiving unit 124 and generates a search plan for accelerating the search process. Here, the search planning unit 125 reads the constraint data 142 from the constraint data storage unit 122, and extracts the constraint rules between different resources from the constraint data 142. The search planning unit 125 collates the extracted constraint rules and search criteria included in the search query to generate positive propositions like the propositions 151 and 154 and negative propositions like the propositions 152 and 155. In addition, the search planning unit 125 sorts the plurality of search criteria included in the search query so as to increase the number of properties that are omitted from determination. The search planning unit 125 outputs the search query after the modification, the positive propositions, and the negative propositions to the search unit 126.

The search unit 126 searches the RDF data 141 stored in the RDF data storage unit 121 on the basis of the search query obtained from the search planning unit 125. The search unit 126 extracts triples indicating resources that match the search criteria specified by the search query from the RDF data 141, and outputs a search result including the extracted triples to the query receiving unit 124. In the search, the search unit 126 refers to the positive and negative propositions received from the search planning unit 125, presumes with respect to partial nodes whether their values of properties match the search criteria, and omits the determinations regarding the properties.

Figure 10:
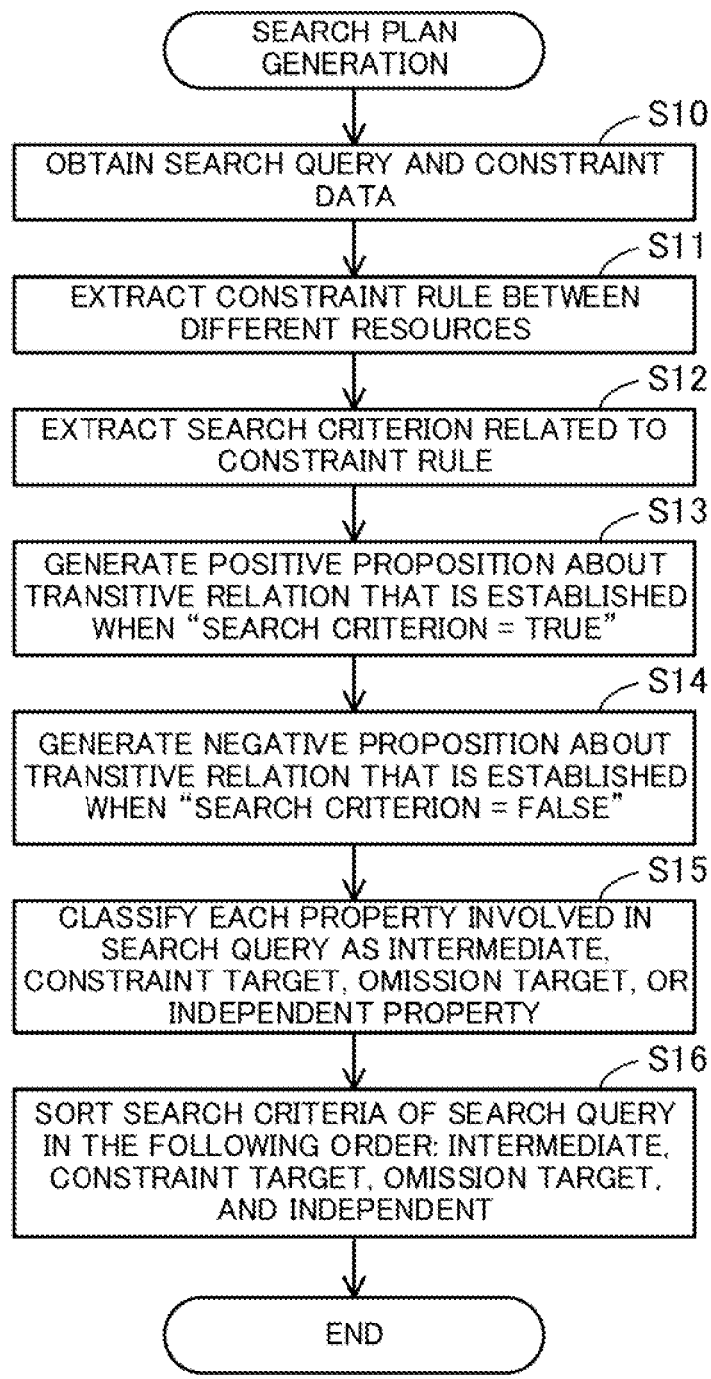
FIG. 10 is a flowchart illustrating an example of a procedure for search plan generation.

FIG. 10 is a flowchart illustrating an example of a procedure for search plan generation.

(S10) The search planning unit 125 obtains a search query and the constraint data 142.

(S11) The search planning unit 125 extracts a constraint rule between resources, which is a rule between different resources, from among the constraint rules defined in the constraint data 142. In the second embodiment, a constraint rule per property is not used for acceleration.

(S12) The search planning unit 125 extracts a search criterion related to the constraint rule from among the plurality of search criteria specified by the search query. In the case where the constraint rule defines the relationship between the value of a property of one resource and the value of a property of another resource, the search criterion related to the constraint rule involves either of the two properties. The two properties to be used for comparison in the constraint rule may be the same or different.

(S13) The search planning unit 125 generates a positive proposition about a transitive relation that is established when the search criterion extracted at step S12 is true, on the basis of the constraint rule extracted at step S11. Here, the search planning unit 125 generates a modus ponens argument indicating that the search criterion is true, with respect to each of the two properties that are used for the comparison in the constraint rule. The search planning unit 125 generates the proposition about the transitive relation in which one of the two modus ponens arguments serves as a premise and the other serves as a conclusion such that the proposition is consistent with the relationship (for example, magnitude relationship or inclusion relationship) indicated by the constraint rule.

(S14) The search planning unit 125 generates a negative proposition about a transitive relation that is established when the search criterion is false, on the basis of the constraint rule. Here, the search planning unit 125 generates a modus tollens argument indicating that the search criterion is false, with respect to each of the two properties that are used for the comparison in the constraint rule. The search planning unit 125 generates the proposition about the transitive relation in which one of the two modus tollens arguments serves as a premise and the other serves as a conclusion such that the proposition is consistent with the relationship indicated by the constraint rule.

(S15) The search planning unit 125 classifies each property involved in the search query as an intermediate property, a constraint target property, an omission target property, or an independent property.

The intermediate property is a property that is used as a predicate between one resource and another resource to be used for comparison in the constraint rule. In the case of the above-described search queries 143 and 145, "Child" is an intermediate property. The constraint target property is a property of the one resource to be used for the comparison in the constraint rule. In the case of the above-described search queries 143 and 145, "Age" is a constraint target property. The omission target property is a property of the other resource to be used for the comparison in the constraint rule. The constraint target property and the omission target property may be the same. In the case of the above-described search queries 143 and 145, "Age" is an omission target property. The independent property is a property that is not involved in the constraint rule. In the case of the above-described search queries 143 and 145, "Gender" is an independent property.

(S16) The search planning unit 125 classifies each search criterion included in the search query as a search criterion relating to an intermediate property, a search criterion relating to a constraint target property, a search criterion relating to an omission target property, and a search criterion relating to an independent property. The search planning unit 125 sorts the plurality of search criteria in the following order: search criteria relating to intermediate properties, search criteria relating to constraint target properties, search criteria relating to omission target properties, and search criteria relating to independent properties.

Figure 11:
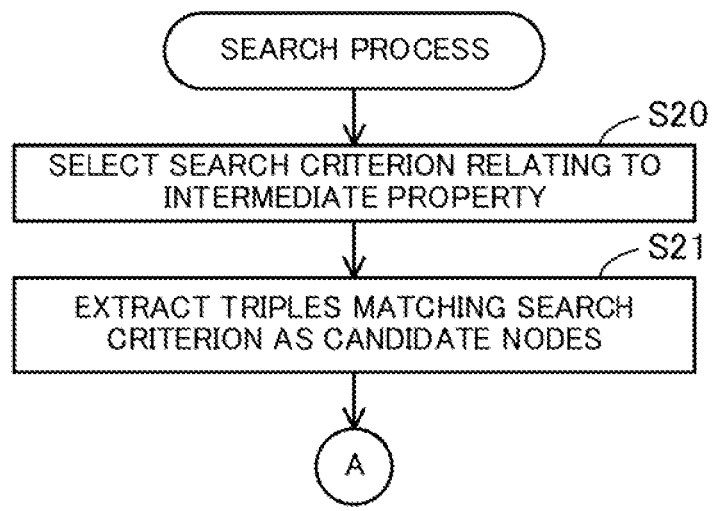
FIG. 11 is a flowchart illustrating an example of a procedure for a search process.

FIG. 11 is a flowchart indicating an example of a procedure for a search process.

(S20) The search unit 126 selects a search criterion relating to an intermediate property from among the plurality of search criteria specified by a search query. In the case where two or more search criteria each relating to an intermediate property are detected, the following step S21 is executed for each search criterion.

(S21) The search unit 126 extracts triples that match the selected search criterion relating to the intermediate property from the RDF data 141. For example, the search unit 126 finds resources that are reached from a base resource on a path with the intermediate property, and extracts triples that each have the intermediate property as a predicate and one of the found resources as an object. The search unit 126 takes the resources corresponding to the objects of the extracted triples as candidate nodes for a search result.

Figure 12:
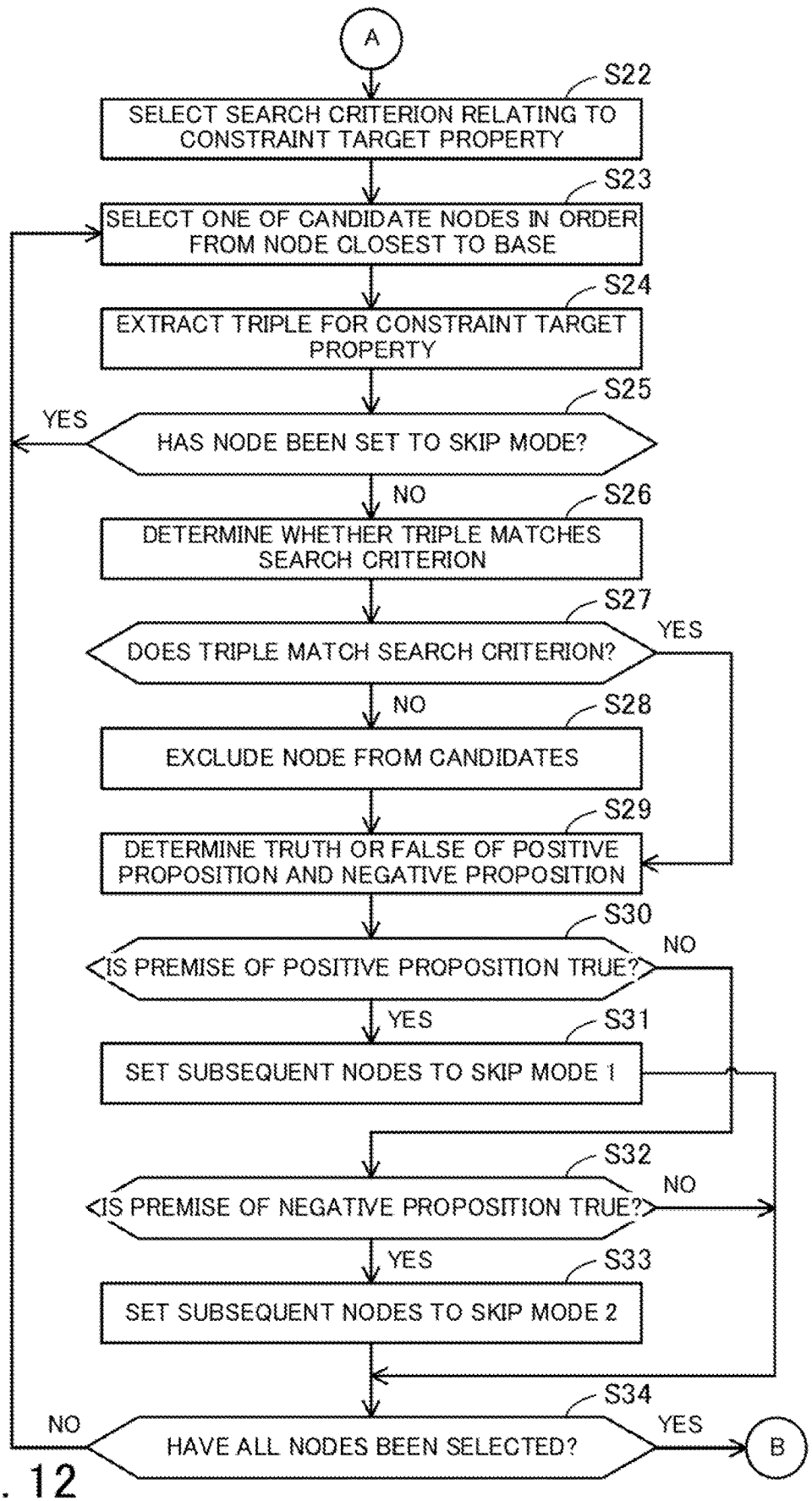
FIG. 12 is a flowchart illustrating the example of the procedure for the search process, continued from FIG. 11.

FIG. 12 is a flowchart illustrating the example of the procedure for the search process, continued from FIG. 11.

(S22) The search unit 126 selects a search criterion relating to a constraint target property from among the plurality of search criteria specified by the search query. In the case where there are two or more search criteria each relating to a constraint target property, the following steps S23 to S34 are executed for each search criterion.

(S23) The search unit 126 selects one of the candidate nodes remaining for the search result, in order from the node closest to the base indicated by the search query.

(S24) The search unit 126 extracts, from the RDF data 141, a triple that has the resource represented by the selected node as a subject and the constraint target property as a predicate. That is, the search unit 126 extracts the value of the constraint target property of the resource currently processed.

(S25) The search unit 126 determines whether the selected node has been set to a skip mode 1 or skip mode 2 to be described later. If such a skip mode has been set, the process returns back to step S23. If such a skip mode has not been set, the process proceeds to step S26.

(S26) The search unit 126 determines whether the triple extracted at step S24 matches the search criterion relating to the constraint target property. For example, if the search criterion specifies a range for the value of the constraint target property, the search unit 126 compares the literal corresponding to the object of the triple with the range specified by the search criterion to determine whether the literal falls within the range.

(S27) The search unit 126 determines whether the triple matches the search criterion. If the triple matches the search criterion, the process proceeds to step S29. Otherwise, the process proceeds to step S28.

(S28) The search unit 126 excludes the selected node from the candidates for the search result. This eliminates the necessity of making further determinations regarding the other properties of the node.

(S29) The search unit 126 determines whether the premise of the positive proposition generated at step S13 is true or false, on the basis of the determination result of step S26. In addition, the search unit 126 determines whether the premise of the negative proposition generated at step S14 is true or false.

(S30) The search unit 126 determines whether the premise of the positive proposition is true. If the premise is true, the process proceeds to step S31. If the premise is false, the process proceeds to step S32.

(S31) The search unit 126 sets the subsequent nodes, which are reached from the selected node on the path with the intermediate property, to the skip mode 1. Then, the process proceeds to step S34.

(S32) The search unit 126 determines whether the premise of the negative proposition is true. If the premise is true, the process proceeds to step S33. If the premise is false, the process proceeds to step S34.

(S33) The search unit 126 sets the subsequent nodes, which are reached from the selected node on the path with the intermediate property, to the skip mode 2. Then, the process proceeds to step S34.

(S34) The search unit 126 determines whether all of the candidate nodes remaining for the search result at step S23 have been selected. If all of the nodes have been selected, the process proceeds to step S35. If any of the nodes has not been selected, the process proceeds back to step S23.

Figure 13:
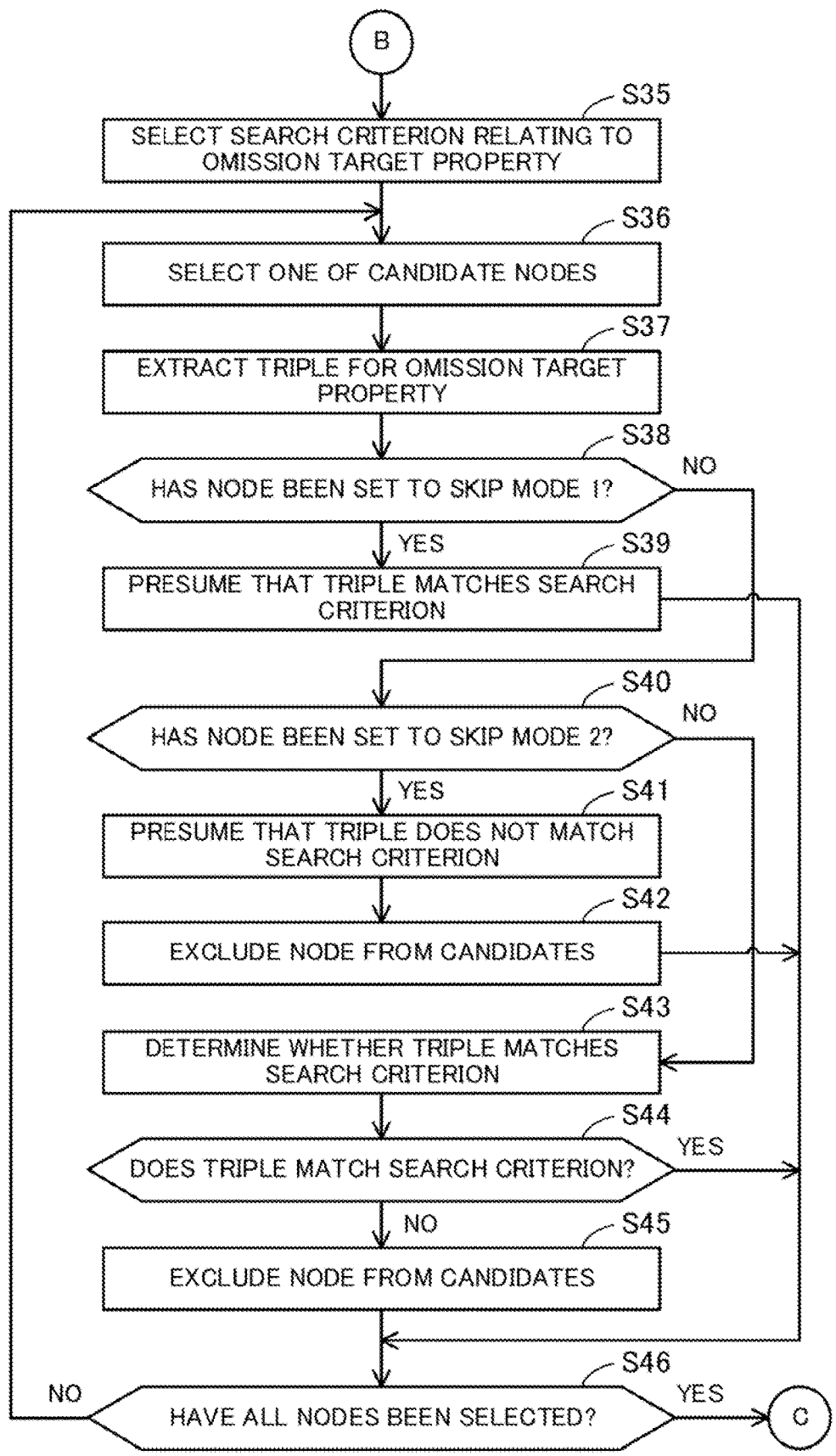
FIG. 13 is a flowchart illustrating the example of the procedure for the search process, continued from FIG. 12.

FIG. 13 is a flowchart illustrating the example of the procedure for the search process, continued from FIG. 12.

The search unit 126 selects a search criterion relating to an omission target property from among the plurality of search criteria specified by the search query. If two or more search criteria each relating to an omission target property are found, the following steps S36 to S46 are executed for each search criterion.

(S36) The search unit 126 selects one of the candidate nodes remaining for the search result.

(S37) The search unit 126 extracts, from the RDF data 141, a triple that has the resource represented by the selected node as a subject and the omission target property as a predicate. That is, the search unit 126 extracts the value of the omission target property of the resource currently processed.

The search unit 126 determines whether the selected node has been set to the skip mode 1. If the selected node has been set to the skip mode 1, the process proceeds to step S39. Otherwise, the process proceeds to step S40.

(S39) The search unit 126 presumes that the triple extracted at step S37 matches the search criterion relating to the omission target property. At this time, the search unit 126 does not need to compare the literal corresponding to the object of the triple with the range specified by the search criterion, and therefore it is possible to omit determining whether the triple matches the search criterion. Then, the process proceeds to step S46.

(S40) The search unit 126 determines whether the selected node has been set to the skip mode 2. If the selected node has been set to the skip mode, the process proceeds to step S41. Otherwise, the process proceeds to step S43.

(S41) The search unit 126 presumes that the triple extracted at step S37 does not match the search criterion relating to the omission target property. At this time, the search unit 126 does not need to compare the literal corresponding to the object of the triple with the range specified by the search criterion, and therefore it is possible to omit determining whether the triple matches the search criterion.

(S42) The search unit 126 excludes the selected node from the candidates for the search result. This eliminates the necessity of making further determinations regarding the other properties of the node. Then, the process proceeds to step S46.

(S43) The search unit 126 determines whether the triple extracted at step S37 matches the search criterion relating to the omission target property. For example, the search unit 126 compares the literal corresponding to the object of the triple with the range specified by the search criterion to determine whether the literal falls within the range.

(S44) The search unit 126 determines whether the triple matches the search criterion. If the triple matches the search criterion, the process proceeds to step S46. Otherwise, the process proceeds to step S45.

(S45) The search unit 126 excludes the selected node from the candidates for the search result. This eliminates the necessity of making further determinations regarding the other properties of the node.

(S46) The search unit 126 determines whether all of the candidate nodes remaining for the search result at step S36 have been selected. If all of the nodes have been selected, the process proceeds to step (S47). If any of the nodes has not been selected, the process proceeds back to step S36.

Figure 14:
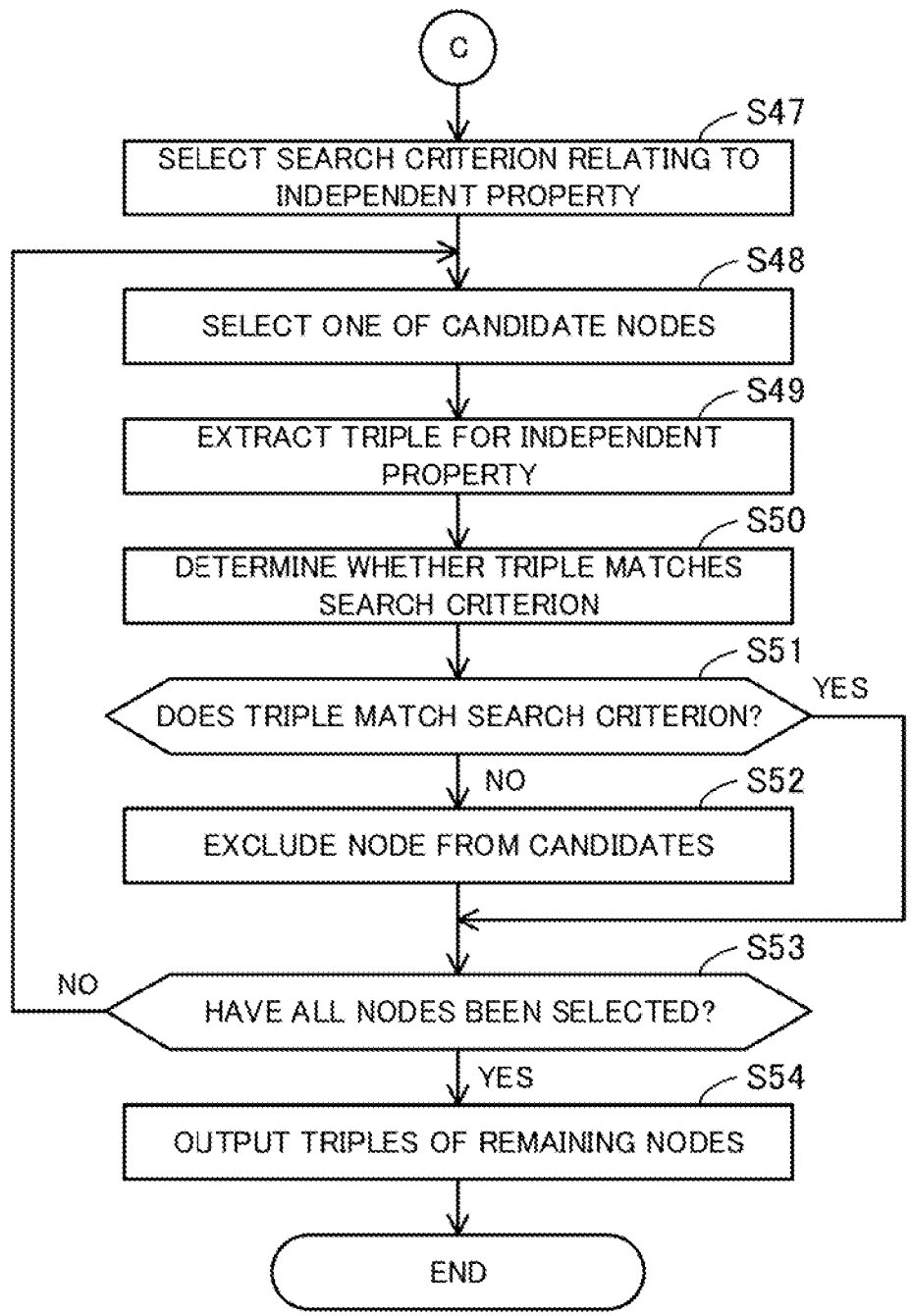
FIG. 14 is a flowchart illustrating the example of the procedure for the search process, continued from FIG. 13.

FIG. 14 is a flowchart illustrating the example of the procedure for the search process, continued from FIG. 13.

(S47) The search unit 126 selects a search criterion relating to an independent property from among the plurality of search criteria specified by the search query. If two or more search criteria each relating to an independent property are found, the following steps S48 to S53 are executed for each search criterion.

(S48) The search unit 126 selects one of the candidate nodes remaining for the search result.

(S49) The search unit 126 extracts, from the RDF data 141, a triple that has the resource represented by the selected node as a subject and the independent property as a predicate. That is, the search unit 126 extracts the value of the independent property of the resource currently processed.

(S50) The search unit 126 determines whether the triple extracted at step S49 matches the search criterion relating to the independent property. For example, the search unit 126 compares the literal corresponding to the object of the triple with the range specified by the search criterion to determine whether the literal falls within the range.

(S51) The search unit 126 determines whether the triple matches the search criterion. If the triple matches the search criterion, the process proceeds to step S53. Otherwise, the process proceeds to step S52.

(S52) The search unit 126 excludes the selected node from the candidates for the search result.

(S53) The search unit 126 determines whether all the candidate nodes remaining for the search result at step S48 have been selected. If all of the nodes have been selected, the process proceeds to step S54. If any of the nodes has not been selected, the process proceeds back to step S48.

(S54) The search unit 126 collects the triples of the nodes that have not been excluded but remain. For example, the search unit 126 collects triples that each have the resource represented by a remaining node as a subject and have been extracted from the RDF data 141 through steps S20 to S53. The search unit 126 then generates a search result including the collected triples. The query receiving unit 124 outputs the search result. For example, the search unit 126 displays the search result on the display device 111. Alternatively, the search unit 126 saves the search result in a storage device such as the HDD 103. Yet alternatively, for example, the search unit 126 sends the search result to another information processing apparatus.

According to the search apparatus 100 of the second embodiment, when performing a search process of a graph database in response to a search query, a constraint rule between properties of different nodes is extracted from constraint data that is previously defined for detecting invalid data. Then, it is presumed, based on the result of determining whether the value of a property of a node matches a search criterion and the constraint rule, whether the value of the property of another adjacent node matches the search criterion, and the determination regarding the property is omitted. For example, based on an affirmative determination result indicating that the value of the property of the node matches the search criterion, an affirmative presumption result indicating that the value of the property of the other adjacent node matches the search criterion is derived. In addition, for example, based on a negative determination result indicating that the value of the property of the node does not match the search criterion, a negative presumption result indicating that the value of the property of the other adjacent node does not match the search criterion is derived.

By doing so, it becomes possible to omit determinations regarding the properties of partial nodes without causing a change in the search result, and thus to accelerate the search process even if a large-scale database is used. In the case where the negative presumption result is derived, it is possible to omit determinations regarding the other properties of that node, which further reduces the number of times of determination. In addition, the search query is modified so that determinations regarding constraint target properties and omission target properties involved in constraint rules are made prior to determinations regarding independent properties that are not involved in the constraint rules. Thus, it is possible to increase the number of properties for which determinations are omissible, which further reduces the number of times of determination.

According to one aspect, it is possible to accelerate a search process of graph data.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing a computer program that causes a computer to perform a process comprising:
receiving a search query for graph data representing a graph including nodes and edges connecting the nodes, each of the nodes being associated with values of a first property and a second property, the search query specifying a search criterion for searching the nodes, the search criterion including a plurality of criterion items including a first criterion item that uses the first property and a second criterion item that uses the second property, the first criterion item specifying that a value of the first property is less than a first threshold;
receiving a constraint rule that uses the first property, the constraint rule indicating that a second value of the first property associated with a second node of the nodes is restricted to be less than a first value of the first property associated with a first node of the nodes;
sorting the plurality of criterion items so that a determination based on the first criterion item is made prior to a determination based on the second criterion item;
determining whether the first value matches the first criterion item;
predicting, when a result of the determining indicates that the first value matches the first criterion item, that the second value matches the first criterion item, in accordance with the constraint rule; and
generating a search result for the search query in accordance with the result of the determining and a result of the predicting.

2. The non-transitory computer-readable storage medium according to claim 1, wherein:
the predicting is executed without determining whether the second value matches the first criterion item.

3. The non-transitory computer-readable storage medium according to claim 1, wherein:
the predicting includes predicting that a third value of the first property associated with a third node of the nodes matches the first criterion item, the third nodes being connected to the second node via one or more edges not more than a second threshold.

4. A search method comprising:
receiving, by a processor, a search query for graph data representing a graph including nodes and edges connecting the nodes, each of the nodes being associated with values of a first property and a second property, the search query specifying a search criterion for searching the nodes, the search criterion including a plurality of criterion items including a first criterion item that uses the first property and a second criterion item that uses the second property, the first criterion item specifying that a value of the first property is less than a first threshold;
receiving, by the processor, a constraint rule that uses the first property, the constraint rule indicating that a second value of the first property associated with a second node of the nodes is restricted to be less than a first value of the first property associated with a first node of the nodes;
sorting, by the processor, the plurality of criterion items so that a determination based on the first criterion item is made prior to a determination based on the second criterion item;
determining, by the processor, whether the first value matches the first criterion item;
predicting, by the processor, when a result of the determining indicates that the first value matches the first criterion item, that the second value matches the first criterion item, in accordance with the constraint rule; and
generating, by the processor, a search result for the search query in accordance with the result of the determining and a result of the predicting.

5. The search method according to claim 4, wherein:
the predicting is executed without determining whether the second value matches the first criterion item.

6. The search method according to claim 4, wherein:
the predicting includes predicting that a third value of the first property associated with a third node of the nodes matches the first criterion item, the third nodes being connected to the second node via one or more edges not more than a second threshold.

7. A search apparatus comprising:
a memory that stores therein graph data representing a graph including nodes and edges connecting the nodes, each of the nodes being associated with values of a first property and a second property; and
a processor that performs a process including
receiving a search query for the graph data, the search query specifying a search criterion for searching the nodes, the search criterion including a plurality of criterion items including a first criterion item that uses the first property and a second criterion item that uses the second property, the first criterion item specifying that a value of the first property is less than a first threshold,
receiving a constraint rule that uses the first property, the constraint rule indicating that a second value of the first property associated with a second node of the nodes is restricted to be less than a first value of the first property associated with a first node of the nodes,
sorting the plurality of criterion items so that a determination based on the first criterion item is made prior to a determination based on the second criterion item,
determining whether the first value matches the first criterion item,
predicting, when a result of the determining indicates that the first value matches the first criterion item, that the second value matches the first criterion item, in accordance with the constraint rule, and
generating a search result for the search query in accordance with the result of the determining and a result of the predicting.

8. The search apparatus according to claim 7, wherein:
the predicting is executed without determining whether the second value matches the first criterion item.

9. The search apparatus according to claim 7, wherein:
the predicting includes predicting that a third value of the first property associated with a third node of the nodes matches the first criterion item, the third nodes being connected to the second node via one or more edges not more than a second threshold.

* * * * *